United States Patent
Nishimura et al.

(10) Patent No.: US 10,406,795 B2
(45) Date of Patent: Sep. 10, 2019

(54) FEED DEVICE FOR REINFORCING FIBER MATERIAL AND METHOD FOR CUTTING REINFORCING FIBER MATERIAL BY USING THE FEED DEVICE

(71) Applicant: TSUDAKOMA KOGYO KABUSHIKI KAISHA, Kanazawa-shi, Ishikawa-ken (JP)

(72) Inventors: Isao Nishimura, Kanazawa (JP); Mitsunobu Futakuchi, Kanazawa (JP)

(73) Assignee: TSUDAKOMA KOGYO KABUSHIKI KAISHA, Kanazawa-Shi (JP)

( * ) Notice: Subject to any disclaimer, the term of this patent is extended or adjusted under 35 U.S.C. 154(b) by 76 days.

(21) Appl. No.: 15/650,075

(22) Filed: Jul. 14, 2017

(65) Prior Publication Data
US 2018/0037018 A1 Feb. 8, 2018

(30) Foreign Application Priority Data

Aug. 4, 2016 (JP) .................. 2016-153883

(51) Int. Cl.
*B32B 37/00* (2006.01)
*B29C 63/00* (2006.01)
(Continued)

(52) U.S. Cl.
CPC .......... *B32B 37/1036* (2013.01); *B26D 1/405* (2013.01); *B26D 7/2628* (2013.01);
(Continued)

(58) Field of Classification Search
CPC .... B32B 37/1036; B26D 1/404; B26D 1/626; B29C 63/024; B29C 70/388; B29C 70/50; B29C 70/504; B29C 70/545; B30B 5/062
See application file for complete search history.

(56) References Cited

U.S. PATENT DOCUMENTS

| 2004/0098852 A1 | 5/2004 | Nelson |
| 2010/0230043 A1 | 9/2010 | Kisch |

(Continued)

FOREIGN PATENT DOCUMENTS

| EP | 2228200 A1 | 9/2010 |
| JP | 2004-175116 | 6/2004 |

(Continued)

OTHER PUBLICATIONS

European Search Report dated Nov. 30, 2017, 1 page.

*Primary Examiner* — Linda L Gray
(74) *Attorney, Agent, or Firm* — Rankin, Hill & Clark LLP

(57) ABSTRACT

A cutting mechanism includes a cutter roll and a rotational driving mechanism for rotationally driving the cutter roll. The cutter roll has a roll body and a blade portion protruding from a peripheral surface of the roll body. The blade portion is formed at a same position on a circumference of the roll body and extends in an axial direction of the roll body. The cutter roll is arranged so that the axial direction is at a predetermined angle with respect to a pull-out direction of the reinforcing fiber material. The cutting mechanism further includes a slide mechanism that displaces cutter roll in the axial direction toward a side in the pull-out direction of the reinforcing fiber material at least when the reinforcing fiber material is cut.

1 Claim, 5 Drawing Sheets

(51) Int. Cl.
| | | |
|---|---|---|
| *B29C 70/00* | (2006.01) |
| *B30B 5/00* | (2006.01) |
| *B26D 1/00* | (2006.01) |
| *B26D 7/00* | (2006.01) |
| *B32B 37/10* | (2006.01) |
| *B29C 63/02* | (2006.01) |
| *B29C 70/50* | (2006.01) |
| *B30B 5/06* | (2006.01) |
| *B29C 70/38* | (2006.01) |
| *B29C 70/54* | (2006.01) |
| *B26D 1/40* | (2006.01) |
| *B26D 7/26* | (2006.01) |

(52) U.S. Cl.
CPC .......... *B29C 63/024* (2013.01); *B29C 70/388* (2013.01); *B29C 70/50* (2013.01); *B29C 70/504* (2013.01); *B29C 70/545* (2013.01); *B30B 5/062* (2013.01); *B29C 63/0021* (2013.01); *B29C 2793/0027* (2013.01); *B29C 2793/0081* (2013.01); *Y10T 156/1077* (2015.01); *Y10T 156/1085* (2015.01); *Y10T 156/1098* (2015.01)

(56) References Cited

U.S. PATENT DOCUMENTS

| | | |
|---|---|---|
| 2011/0247743 A1 | 10/2011 | Slack et al. |
| 2013/0118683 A1* | 5/2013 | Nelson ................ B29C 70/202 156/250 |
| 2015/0328876 A1 | 11/2015 | Nishimura |

FOREIGN PATENT DOCUMENTS

| | | |
|---|---|---|
| JP | 2011-219269 | 11/2011 |
| JP | 2014-073591 | 4/2014 |
| JP | 2015-217540 | 12/2015 |

* cited by examiner

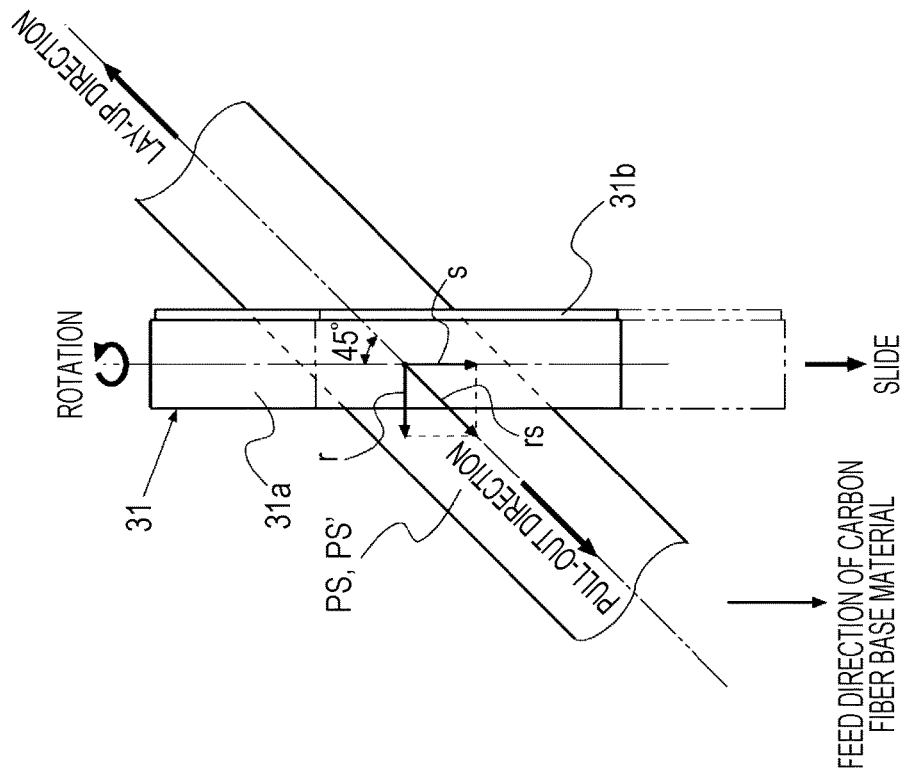
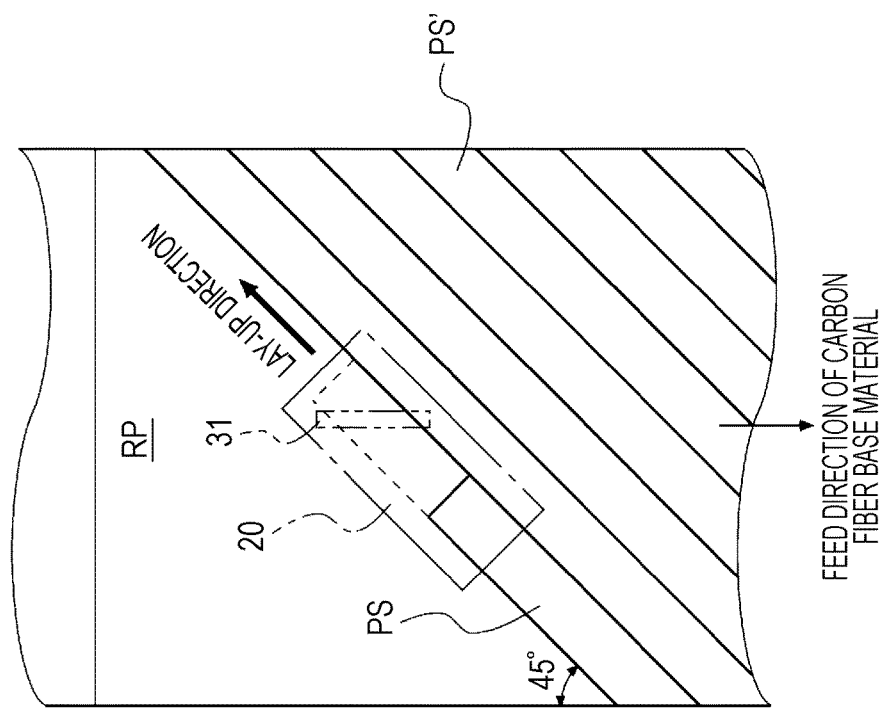

FEED DEVICE FOR REINFORCING FIBER MATERIAL AND METHOD FOR CUTTING REINFORCING FIBER MATERIAL BY USING THE FEED DEVICE

BACKGROUND OF THE INVENTION

1. Field of the Invention

The present invention relates to a feed device for an elongated sheet-shaped reinforcing fiber material made of a reinforcing fiber and a matrix resin, the device including a raw-material roll formed by winding the reinforcing fiber material, and a cutting mechanism for cutting the reinforcing fiber material pulled out from the raw-material roll and hence cutting off a reinforcing fiber material piece from the reinforcing fiber material; and a method for cutting the reinforcing fiber material by using the feed device.

2. Description of the Related Art

A feed device for a reinforcing fiber material like the one described above may be, for example, a device disclosed in Japanese Unexamined Patent Application Publication No. 2015-217540. The feed device disclosed in Japanese Unexamined Patent Application Publication No. 2015-217540 is a device for feeding a prepreg of an automatic lay-up machine for laying up the prepreg, serving as a reinforcing fiber material formed by impregnating a plurality of reinforcing fibers (carbon fibers, glass fibers, or the like) with a matrix resin. The feed device has mounted thereon a raw-material roll formed by winding an elongated sheet-shaped prepreg (prepreg sheet), and is provided to move on a table on which the prepreg is laid up. The feed device further includes a cutting mechanism that cuts and separates a portion of the prepreg sheet laid up on the table from the prepreg sheet extending from the raw-material roll, and hence cuts off a prepreg sheet piece which is the laid up portion from the prepreg sheet of the raw-material roll.

With this configuration, in the automatic lay-up machine, the feed device is moved on the table in a lay-up direction, and hence the prepreg sheet is pulled out from the raw-material roll and laid up on the table. The prepreg sheet is cut by the cutting mechanism when the prepreg sheet with a preset length is pulled out, and hence the prepreg sheet piece with the preset length is laid up on the table. The lay-up described here includes lay-up on a prepreg sheet piece placed already on the table, lay-up on a sheet material such as a film placed on the table, and lay-up directly on the table. Moreover, in the case of this feed device, the pull-out direction of the prepreg sheet (reinforcing fiber material) is a direction parallel to the lay-up direction (moving direction of the feed device) and opposite to the lay-up direction (direction to the rear side of the moving direction).

The reinforcing fiber material (prepreg) is a base material of a fiber reinforced composite such as fiber reinforced plastic (FRP). The fiber reinforced composite is formed in, as one of processes, a lay-up process of laying up a plurality of reinforcing fiber material pieces cut off from an elongated sheet-shaped reinforcing fiber material of a raw-material roll as the one described above. Therefore, the fiber reinforced composite has a multi-ply structure of the reinforcing fiber material pieces. The reinforcing fiber material may be a woven material obtained by impregnating a woven fabric, formed by using reinforcing fibers as warp and weft yarns, with a matrix resin or so-called UD material obtained by binding reinforcing fibers together by impregnating the reinforcing fibers with the matrix resin while the reinforcing fibers are arranged so as to extend in one direction. As an alternative to the above-described prepreg obtained by impregnating the woven fabric or the reinforcing fibers arranged so as to extend in one direction with the matrix resin, the reinforcing fiber material may be so-called semi-preg, which is obtained by coating the reinforcing fibers with the matrix resin by a certain amount of matrix resin to keep the reinforcing fibers bound.

When the fiber reinforced composite is formed, the reinforcing fiber material pieces may be laid up such that the orientation direction of the reinforcing fibers differs between the reinforcing fiber material pieces that form the respective layers. The fiber reinforced composite formed in this way is known to have a higher rigidity and a higher strength compared to that formed by laying up the reinforcing fiber material pieces such that the reinforcing fibers have the same orientation direction.

The method for laying up reinforcing fiber material pieces for forming such a fiber reinforced composite may be, for example, when the same reinforcing fiber material is used and the reinforcing fiber material pieces are sequentially laid up, a conceivable method may be laying up reinforcing fiber material pieces such that the orientation direction of reinforcing fibers in a reinforcing fiber material piece to be laid up differs from the orientation direction of reinforcing fibers in a laid up reinforcing fiber material piece (a reinforcing fiber material piece defining a lower layer in the fiber reinforced composite) on which the aforementioned reinforcing fiber material piece is to be laid up.

Another conceivable method may be forming a fiber reinforced composite in which reinforcing fiber material pieces with different orientation directions of reinforcing fibers as the one described above by using a bias-ply material (angle layer material) made of a reinforcing fiber material as disclosed in, for example, Japanese Unexamined Patent Application Publication No. 2011-219269. To be specific, the angle layer material is formed by laying up a reinforcing fiber material on a sheet-shaped support member (a sheet material made of, for example, a polyethylene film or paper) which is a base material, at an angle with respect to the longitudinal direction of the support member, and hence is formed as a material in which the orientation direction of reinforcing fibers is at an angle with respect to the longitudinal direction. A fiber reinforced composite as the one described above can be obtained by preparing a plurality of kinds of angle layer materials which are angle layer materials similar to the one described above and formed such that reinforcing fibers are arranged in different orientation directions, and by laying up the angle layer materials in the same lay-up direction.

In the feed device for the reinforcing fiber material described in Japanese Unexamined Patent Application Publication No. 2015-217540 described above, the cutting mechanism is provided to cut the reinforcing fiber material in a direction parallel to the width direction (in the direction perpendicular to the longitudinal direction) of the sheet-shaped reinforcing fiber material (prepreg sheet). However, when a reinforcing fiber material (piece) is laid up on a laid up reinforcing fiber material piece in a different lay-up direction (in a different orientation direction of reinforcing fibers) with respect to the lay-up direction of the laid up reinforcing fiber material piece or when a reinforcing fiber material is laid up on a support member such that the orientation direction of reinforcing fibers is at an angle with respect to the longitudinal direction of the support member as described above, in case of cutting the reinforcing fiber materials parallel to the width direction, as illustrated in FIG. 5, both side edges of the reinforcing fiber material pieces to be laid up are not aligned in line, and both end portions of the reinforcing fiber material pieces (portions with oblique lines in the figure) protrude from both the side edges of the material of the receiving side (the laid up reinforcing fiber material piece or the support member). In this case, the protruding portions have to be cut in a later process, the cut portions are thrown away, and the reinforcing fiber material unfortunately wastefully consumed. Hence, when the reinforcing fiber material is laid up with the different orientation direction of the reinforcing fibers as described above, it is demanded to cut the reinforcing fiber material at an angle with respect to the width direction and the longitudinal direction in accordance with the lay-up direction.

Regarding the cutting mechanism, the cutting mechanism described in Japanese Unexamined Patent Application Publication No. 2015-217540 has a configuration of cutting a reinforcing fiber material by advancing and retracting a cutter to and from the reinforcing fiber material. However, in this automatic lay-up machine, a timing at which the reinforcing fiber material is cut by the cutter is a timing before the lay-up is completed (in the middle of the lay-up). At this timing, the reinforcing fiber material is continuously pulled out from the raw-material roll. That is, the reinforcing fiber material is moving. When the moving reinforcing fiber material is cut, in the cutting mechanism configured to cut the reinforcing fiber material by advancing and retracting the cutter to and from the reinforcing fiber material as described above, the reinforcing fiber material may not be reliably (completely) cut, or the cutter may interfere with the movement of the reinforcing fiber material.

For the cutting mechanism for cutting the moving reinforcing fiber material, for example, a device disclosed in Japanese Unexamined Patent Application Publication No. 2004-175116 is employed as a desirable device. The device includes a cutter roll having a roll body (cutter drum) and a blade portion (cutter blade) formed to protrude from a peripheral surface of the roll body; and a receiving member (idler drum) provided to face the cutter roll. The cutter roll is rotated to cut a reinforcing fiber material (strip-shaped material).

In the case of using such a cutting mechanism, when the moving sheet-shaped reinforcing fiber material is cut at an angle with respect to the width direction and the longitudinal direction thereof, if the blade portion of the cutter roll extends in the axial direction of the roll body (hereinafter, also merely referred to as "axial direction") at a same position on a circumference of the roll body, that is, if the blade portion is formed in a linear shape as illustrated in FIG. 5 of Japanese Unexamined Patent Application Publication No. 2004-175116, the cutter roll is arranged in a state in which the axial direction coincides with the angle of cutting (cutting angle) (for example, see FIG. 6). However, in this case, a displacement direction of the blade portion along with rotation of the roll body (in particular, the displacement direction of the blade portion on the reinforcing fiber material side with respect to the axis of the roll body in a view in the axial direction) markedly differs from the moving direction (pull-out direction) of the reinforcing fiber material in a view in the thickness direction of the reinforcing fiber material. Hence, the reinforcing fiber material may not be reliably (completely) cut, or the position of the reinforcing fiber material may be shifted in the width direction. Therefore, to cut the reinforcing fiber material at the above-described cutting angle, Japanese Unexamined Patent Application Publication No. 2004-175116 describes a cutter roll configured such that a blade portion is spirally formed on a peripheral surface of a roll body (refer to Japanese Unexamined Patent Application Publication No. 2014-073591).

However, there may be some problems when the blade portion of the cutter roll is spirally formed in the cutting mechanism that cuts the reinforcing fiber material by the cutter roll and the receiving member. For example, such a cutter roll has to have a blade portion to cut a sheet material at a desirable cutting angle as described above; however, it may be difficult to manufacture the blade portion, and the manufacturing cost of the spirally formed blade portion may be higher than the manufacturing cost of the linearly formed blade portion.

Also, when a reinforcing fiber material is laid up with a different orientation direction of reinforcing fibers on a material on the receiving side as described above, the lay-up direction (cutting angle) of the reinforcing fiber material to be laid up with respect to the material on the receiving side is not limited to one kind. The lay-up is executed at various angles in accordance with demands on a fiber reinforced composite to be formed. In contrast, when the cutter roll formed with the spiral blade portion cuts the sheet material while being rotated in the same direction as the moving direction of the sheet material, the cutting angle provided by the same cutter roll is only one kind, resulting in poor versatility. Therefore, to deal with cutting in a plurality of kinds of lay-up directions, a plurality of kinds of cutter rolls having blade portions with different spiral structures corresponding to the plurality of kinds of lay-up directions have to be prepared. This may increase the manufacturing cost, and the cutter roll has to be replaced with another one.

Further, the blade portion of the cutter roll gradually wears as continuously used. Hence, it is required to regrind the blade edge of the blade portion at a timing at which the wear progresses by a certain degree. However the regrinding has to be performed such that the height of edge after the regrinding is substantially the same. However, it is extremely difficult to regrind the blade edge to have substantially the same height of edge for the cutter roll with the spiral blade portion. Hence, such a cutter roll may not be continuously used by regrinding the blade portion (blade edge) when the wear progresses. The cutter roll has to be replaced with new one.

SUMMARY OF THE INVENTION

The present invention relates to a feed device for a reinforcing fiber material including a cutting mechanism for cutting the reinforcing fiber material by a cutter roll and a receiving member. The present invention provides a cutting mechanism and a cutting method that employ a cutter roll of the cutting mechanism including a linearly formed blade portion instead of the above-described spirally formed blade portion, and can cut the reinforcing fiber material reliably and stably.

A feed device for a reinforcing fiber material according to an aspect of the present invention presupposes a feed device for feeding an elongated sheet-shaped reinforcing fiber material made of a reinforcing fiber and a matrix resin, the feed device including a raw-material roll formed by winding the reinforcing fiber material, and a cutting mechanism for cutting the reinforcing fiber material pulled out from the raw-material roll and hence cutting off a reinforcing fiber material piece from the reinforcing fiber material.

Based on the presupposition, in the feed device according to the aspect of the present invention, the cutting mechanism includes a cutter roll, a receiving member, and a rotational driving mechanism for rotationally driving the cutter roll. The cutter roll has a roll body and a blade portion protruding from a peripheral surface of the roll body. The blade portion is formed at a same position on a circumference of the roll body and extends in an axial direction of the roll body. The cutter roll is arranged so that the axial direction is at a predetermined angle with respect to a pull-out direction of the reinforcing fiber material. The receiving member extends in the axial direction and is provided to face the cutter roll. The cutting mechanism further includes a slide mechanism that displaces the cutter roll in the axial direction toward a side in the pull-out direction of the reinforcing fiber material at least when the reinforcing fiber material is cut.

Also, a method for cutting a reinforcing fiber material according to another aspect of the present invention presupposes a feed device for cutting an elongated sheet-shaped reinforcing fiber material made of a reinforcing fiber and a matrix resin. The feed device includes a raw-material roll formed by winding the reinforcing fiber material, and a cutting mechanism for cutting the reinforcing fiber material pulled out from the raw-material roll and hence cutting off a reinforcing fiber material piece from the reinforcing fiber material. The cutting mechanism includes a cutter roll and a receiving member. The cutter roll has a roll body and a blade portion protruding from a peripheral surface of the roll body. The blade portion is formed at a same position on a circumference of the roll body and extends in an axial direction of the roll body. The receiving member extends in the axial direction and is provided to face the cutter roll.

Based on the presupposition, the cutting method according to the aspect of the present invention includes arranging the cutter roll of the cutting mechanism so that the axial direction is at a predetermined angle with respect to a pull-out direction of the reinforcing fiber material; and rotationally driving the cutter roll so as to cut the reinforcing fiber material when a pull-out length of the reinforcing fiber material from the raw-material roll reaches a preset length, and displacing the cutter roll in the axial direction toward a side in the pull-out direction of the reinforcing fiber material at least when the reinforcing fiber material is cut.

According to the aspects of the present invention, "when the reinforcing fiber material is cut" included in "at least when the reinforcing fiber material is cut" represents a period which the blade portion contacts the reinforcing fiber material along with the rotation of the cutter roll. To be more specific, in the cutting mechanism, the blade portion is rotated around the axis of the roll body along with the rotational driving of the cutter roll. Also, the gap between the roll body of the cutter roll and the reinforcing fiber material is set so that the reinforcing fiber material is completely cut, that is, the tip end of the blade portion reaches a surface (back surface) opposite to a surface (front surface) of the reinforcing fiber material near the cutter roll, at a timing at which a line connecting the axis of the roll body and the tip end of the blade portion protruding from the peripheral surface of the roll body becomes perpendicular to the reinforcing fiber material (at a timing at which the blade portion most closely approaches the reinforcing fiber material) in a view in the axial direction. Hence, along with the above-described rotation, the tip end of the blade portion contacts the front surface of the reinforcing fiber material first, and the blade portion reaches the state at the closest approach timing while the blade edge gradually bites into the reinforcing fiber material. Then, the blade edge of the blade portion gradually comes out from the thickness range of the reinforcing fiber material and becomes separated. "When the reinforcing fiber material is cut" mentioned above represents a period from when the blade portion starts contacting the reinforcing fiber material to when the blade portion is separated.

Also, "the side in the pull-out direction of the reinforcing fiber material" is the side toward which the entire cutter roll moves in the pull-out direction (moving direction) of the reinforcing fiber material with regard to the longitudinal direction of the reinforcing fiber material.

With the feed device for the reinforcing fiber material and the method for cutting the reinforcing fiber material by using the feed device according to the aspects of the present invention, the cutting mechanism that cuts the reinforcing fiber material by using the cutter roll and the receiving member is employed as described above. Also, the cutter roll is provided such that the axis thereof is at the angle with respect to the pull-out direction of the reinforcing fiber material. When the reinforcing fiber material is cut at the angle with respect to the width direction and the longitudinal direction of the reinforcing fiber material, the reinforcing fiber material is cut by the cutter roll having the blade portion linearly formed as described above. Accordingly, the problem arising when the cutter roll has the spiral blade portion as described above is not present.

Moreover, the cutting mechanism is configured such that the cutter roll (blade portion) moved in the axial direction while the cutter roll cuts the reinforcing fiber material. When the reinforcing fiber material is cut, the contact part of the blade portion with respect to the reinforcing fiber material is displaced toward the side in the moving direction of the reinforcing fiber material. Accordingly, since the cutter roll having the linearly formed blade portion is provided as described above, even if the displacement direction of the blade portion along with the rotation of the roll body and the movement direction of the reinforcing fiber material are markedly different from each other, the reinforcing fiber material can be reliably cut, and the positional shift in the width direction of the reinforcing fiber material caused by the contact with the blade portion can be prevented as much as possible.

That is, in a view in the thickness direction of the reinforcing fiber material, the direction in which the blade portion is displaced along with the rotation of the roll body is the direction perpendicular to the axial direction. In contrast, when the reinforcing fiber material is cut, the blade portion is also displaced in the axial direction. By combining both the displacements, the displacement direction when the reinforcing fiber material is cut of each point on the contact part of the blade portion approaches the moving direction of the reinforcing fiber material as compared with only the displacement direction of the blade portion along with the rotation of the roll body (or coincides with the moving direction of the reinforcing fiber material depending on the angle of the axial direction with respect to the moving direction of the reinforcing fiber material). Accordingly, with the aspects of the present invention, even when the cutter roll is arranged so that the axial direction is at the angle with respect to the width direction and the longitudinal direction of the reinforcing fiber material, the relationship between the moving direction of the reinforcing fiber material and the displacement direction of the blade portion approaches (coincides with) the case where the cutter roll is arranged so that the axial direction coincides with the width direction of the reinforcing fiber material. Accordingly, the reinforcing fiber material can be reliably cut, and the positional shift in the width direction of the reinforcing fiber material along with the contact with the blade portion can be prevented as much as possible.

BRIEF DESCRIPTION OF THE DRAWINGS

FIGS. 4A and 4B are schematic explanatory views for explaining the feed head having mounted thereon the feed device according to the present invention, and an operation of the cutting mechanism of the feed device;

DESCRIPTION OF THE PREFERRED EMBODIMENTS

Figure 1:
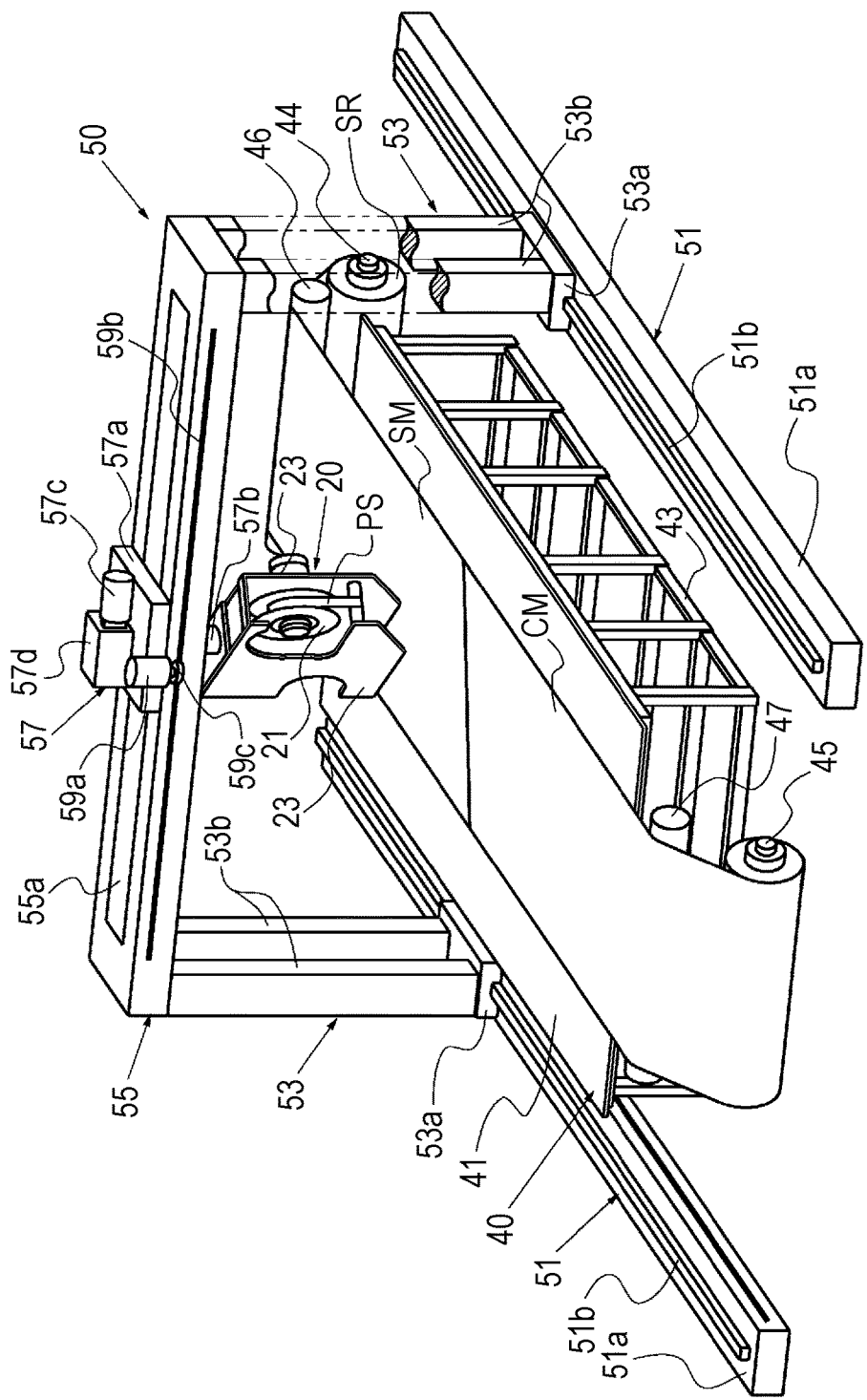
FIG. 1 is a perspective view illustrating an automatic lay-up machine including a feed head having mounted thereon a feed device as an example of a machine to which a feed device according to the present invention is applied.
Figure 2:
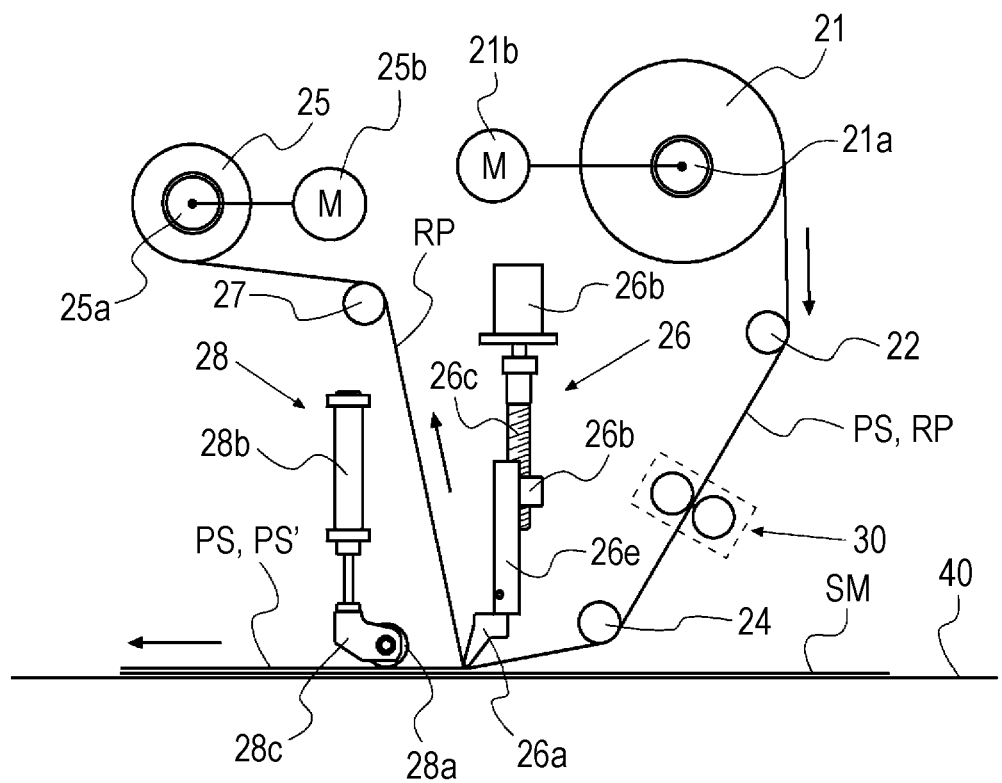
FIG. 2 is a side view schematically illustrating an inside configuration of the feed head of the automatic lay-up machine illustrated in FIG. 1.

Hereinafter, for a feed device for a reinforcing fiber material according to the present invention and a method for cutting the reinforcing fiber material by using the feed device, an embodiment (exemplary embodiment) is described. An exemplary embodiment (this exemplary embodiment) described below is an example, in which the feed device is mounted on an automatic lay-up machine that is illustrated in FIGS. 1 and 2, and that lays up a sheet-shaped reinforcing fiber material fed from the feed device on a table. Also, in this exemplary embodiment, it is assumed that the reinforcing fiber material is a sheet material (prepreg sheet) made of a prepreg obtained by impregnating carbon fibers serving as reinforcing fibers with a thermoplastic resin such as epoxy resin serving as a matrix resin. Moreover, it is assumed that the automatic lay-up machine lays up a prepreg sheet piece on a sheet material such as a film serving as a support member fed on the table, at an angle with respect to the width direction and the longitudinal direction of the sheet material; and hence the automatic lay-up machine manufactures a sheet-shaped carbon fiber base material serving as an angle layer material which is a base of carbon fiber reinforced plastic (CFRP).

First, the automatic lay-up machine on which the feed device according to the present invention is mounted is described in this exemplary embodiment.

As illustrated in FIG. 1, the automatic lay-up machine includes a feed head 20 having mounted thereon a raw-material roll 21 of the aforementioned prepreg sheet PS, a table 40 on which the prepreg sheet PS (prepreg sheet piece PS', described later) is laid up in a manner sequentially arranged side by side and thus a carbon fiber base material CM is formed, and a double-housing support mechanism 50 that supports (suspends) the feed head 20 in a hanging manner and that moves the feed head 20 to lay up the prepreg sheet PS on an upper surface of the table 40. The automatic lay-up machine also includes a let-off mechanism for letting off a sheet material SM on which the prepreg sheet PS is to be laid up, and a wind-up mechanism that winds up the carbon fiber base material CM formed in a sheet shape on the table 40.

Each of the above-described components will now be described. The table 40 includes a top plate 41 having a rectangular shape in plan view, and a support base 43 that supports the top plate 41. The table 40 is arranged such that the longitudinal direction of the op plate 41 is parallel to a feed direction of the sheet material SM. With this arrangement, the prepreg sheet PS is laid up on the sheet material SM on the upper surface of the top plate 41.

The support mechanism 50 has the double-housing structure as described above, and includes a gantry unit and a saddle unit 57. The gantry unit includes a pair of side rails 51, a pair of columns 53 provided so as to correspond to the respective side rails 51, and a crossbeam 55 that extends between the columns 53. The saddle unit 57 is provided on the crossbeam 55 of the gantry unit and supports the feed head 20.

Regarding the support mechanism 50, the side rails 51 of the gantry unit form a base of the support mechanism 50, and include elongated rectangular columnar base portions 51a as main bodies thereof. The side rails 51 are placed on the floor surface at both sides of the table 40 in the short-side direction of the top plate 41 such that the longitudinal direction of the side rails 51 is parallel to the long-side direction of the top plate 41 of the table 40. A guide rail 51b is provided on the top surface of the base portion 51a of each side rail 51. The guide rail 51b guides movement of the corresponding column 53 in longitudinal direction. As described above, the long-side direction of the table 40 (top plate 41) and the longitudinal direction of the side rails 51 are the same, and these directions coincide with the front-rear direction of the automatic lay-up machine. In the following description, these directions and directions parallel thereto are generically referred to as "front-rear direction."

Each column 53 includes a mount portion 53a and a pair of pillars 53b that stands on the mount portion 53a. The mount portion 53a of each column 53 is mounted on the base portion 51a of the corresponding side rail 51. The mount portion 53a of each column 53 is guided by the guide rail 51b of the side rail 51 so as to be movable in the front-rear direction of the side rail 51.

The crossbeam 55 is an elongated rectangular columnar beam member, and extends between the columns 53 such that both ends thereof are respectively attached to the top ends of the pillars 53b of the columns 53. When the crossbeam 55 is arranged in the above-described manner, the columns 53 are at the same position in the front-rear direction of the side rails 51. Thus, the crossbeam 55 is arranged such that the longitudinal direction thereof coincides with the direction perpendicular to the front-rear direction of the side rails 51 (short-side direction of the table 40 (top plate 41)).

In the gantry unit including the above-described beam structure, a driving mechanism including, for example, a rack, a pinion gear, and a driving motor (none of them are illustrated) is provided between each side rail 51 and the corresponding column 53. More specifically, the gantry unit is configured so that the columns 53 and the crossbeam 55 that extends between the columns 53 are driven by the driving mechanisms so as to move in the front-rear direction of the side rails 51. As described above, the long-side direction of the crossbeam 55 and the short-side direction of the table 40 (top plate 41) are the same, and these directions coincide with the width direction of the automatic lay-up machine. In the following description, these directions and directions parallel thereto are generically referred to as "width direction."

The saddle unit 57 is a mechanism for allowing the feed head 20 to be supported by the support mechanism 50, and is provided on the crossbeam 55 of the gantry unit. The saddle unit 57 includes a plate-shaped saddle base 57a, which is movable in the width direction on the crossbeam 55, as a main body. The saddle unit 57 also includes a support shaft 57b that is supported rotatably with respect to the saddle base 57a in such a manner that the support shaft 57b protrudes downward from a surface of the saddle base 57a that faces the crossbeam 55. The crossbeam 55 of the gantry unit has a hole 55a that extends through the crossbeam 55 in the top-bottom direction and that is elongated in the width direction. The hole 55a receives the support shaft 57b and enables the saddle unit 57 to be moved in the width direction. The support shaft 57b of the saddle unit 57 extends downward through the hole 55a to a region below the crossbeam 55.

The saddle unit 57 includes a head driving mechanism provided on the saddle base 57a. The head driving mechanism is a mechanism for rotating the support shaft 57b, and includes a driving motor 57c and a driving-force transmission mechanism 57d that couples the driving motor 57c with the support shaft 57b and transmits the rotation of the output shaft of the driving motor 57c to the support shaft 57b. Accordingly, the support shaft 57b of the saddle unit 57 is rotatable around the axis thereof that extends in the vertical direction by the head driving mechanism.

A driving mechanism is provided between the saddle unit 57 and the crossbeam 55. The driving mechanism moves the saddle unit 57 in the width direction. An example of the driving mechanism is illustrated. This driving mechanism includes a driving motor 59a attached to a side surface of the saddle base 57a of the saddle unit 57 such that the axis of the output shaft of the driving motor 59a extends in the vertical direction, a rack 59b attached to a side surface of the crossbeam 55, and a pinion gear 59c that is attached to the output shaft of the driving motor 59a and meshes with the rack 59b. Thus, the support mechanism 50 is configured such that the saddle unit 57 can be driven by the driving mechanism so as to move in the width direction on the crossbeam 55.

A let-off mechanism and a wind-up mechanism have configurations similar to those of a related machine and hence the detailed description is omitted. However, the let-off mechanism and the wind-up mechanism are arranged with the table 40 arranged therebetween in the front-rear direction. That is, the automatic lay-up machine includes the let-off mechanism at one end side (rear side) of the table 40 and the wind-up mechanism at the other end side (front side) of the table 40.

The let-off mechanism includes a support mechanism (not illustrated) that supports a let-off shaft 44 and a driving mechanism (not illustrated) that rotationally drives the let-off shaft 44 supported by the support mechanism. The let-off mechanism also includes a guide roll 46 provided between the let-off shaft 44 and the table 40. Moreover, the let-off shaft 44 supports a sheet roll SR in which a sheet material SM is wound in a roll shape in the let-off mechanism.

The wind-up mechanism includes a support mechanism (not illustrated) that supports a wind-up shaft 45 and a driving mechanism (not illustrated) that rotationally drives the wind-up shaft 45 supported by the support mechanism, similarly to the let-off mechanism. The wind-up mechanism also includes a guide roll 47 provided between the wind-up shaft 45 and the table 40.

The sheet material SM pulled out from the sheet roll SR in the let-off mechanism is guided toward the table 40 by the guide roll 46, passes through the table 40 (top plate 41), and reaches the wind-up mechanism. The sheet material SM is placed on the top plate 41 of the table 40. The sheet material SM moves toward the wind-up mechanism while sliding on the upper surface of the top plate 41. Moreover, on the table 40 as described above, the prepreg sheet PS is laid up on the sheet material SM, which will be described later in more detail. Hence, in a region on the wind-up side with respect to the lay-up position on the table 40, the sheet material SM is not provided by itself, but the carbon fiber base material CM in which the prepreg sheet PS is laid up on the sheet material SM is provided. The carbon fiber base material CM is guided toward the wind-up shaft 45 by the guide roll 47 in front of the table 40, and is wound up by the wind-up shaft 45.

The sheet material SM (carbon fiber base material CM) is pulled toward the wind-up mechanism when the wind-up shaft 45 is rotationally driven and the sheet material SM is wound up around the wind-up shaft 45 in the wind-up mechanism. The let-off shaft 44 of the let-off mechanism is rotationally driven in accordance with the pull of the sheet material SM by the wind-up mechanism. Accordingly, the sheet material SM is kept in a proper tension state and moves without wrinkle or slack on the table 40.

The feed head 20 that lays up the prepreg sheet PS on the table 40 as described above is attached to the support shaft 57b of the saddle unit 57 of the support mechanism 50. Accordingly, the feed head 20 is suspended from the crossbeam 55 of the support mechanism 50. In the support mechanism 50, the columns 53 are driven so as to move in the front-rear direction on the side rails 51, and/or the saddle unit 57 is driven so as to move in the width direction on the crossbeam 55, so that the feed head 20 moves in the front-rear direction, in the width direction, or in a direction that crosses the front-rear and width directions above the table 40.

The feed head 20 includes a support frame including a pair of support plates 23 as a main body, and supports the raw-material roll 21 being a portion of a feed device according to the present invention in the region between the support plates 23. The raw-material roll 21 is formed by winding the above-described sheet-shaped (tape-shaped) prepreg sheet PS around a reel (winding frame). The raw-material roll 21 is fitted to a support shaft 21a rotatably provided between the support plates 23 so that the reel part is non-rotatable relative to the support shaft 21a. Accordingly, the raw-material roll 21 is supported rotatably relative to the support frame (FIG. 2).

The prepreg sheet PS according to this exemplary embodiment uses the matrix resin as the thermoplastic resin as described above, and hence is adhesive. Therefore, release paper (also referred to as parting paper) RP is bonded to one surface of the prepreg sheet PS to prevent bonding of a wound layer of the prepreg sheet PS wound on the raw-material roll 21 to another neighboring wound layer. The prepreg sheet PS wound in the raw-material roll 21 such that the surface of the prepreg sheet PS with the release paper RP is arranged inside in the radial direction.

With this configuration, in the automatic lay-up machine, the prepreg sheet PS is pulled out from the raw-material roll 21 mounted in the feed head 20, and prepreg sheet pieces PS', which are reinforcing fiber material pieces cut off from the prepreg sheet PS, are sequentially laid up on the table 40 (top plate 41). Accordingly, the feed head 20 includes configurations for laying up the prepreg sheet pieces PS' on the table 40, in the support frame (in the region between the support plates 23).

FIG. 2 is a schematic diagram illustrating the configuration in the support frame of the feed head 20. As illustrated in FIG. 2, in the feed head 20, the prepreg sheet PS pulled out from the raw-material roll 21 is wound around guide rolls 22 and 24 and hence redirected, and is fed toward a lay-up mechanism that lays up the prepreg sheet PS on the table 40.

The feed head 20 also includes a cutting mechanism 30 (the details on the configuration will be described later) that is a portion of the feed device according to the present invention. The cutting mechanism 30 cuts off a prepreg sheet piece PS' from the prepreg sheet PS so that the prepreg sheet PS is laid up as a prepreg sheet piece PS' with a preset length. That is, the feed head 20 includes the feed device for the prepreg sheet PS as a reinforcing fiber material according to the present invention. The feed device includes the raw-material roll 21 and cutting mechanism 30 described above.

The cutting mechanism 30 is provided between the guide roll 22 and the guide roll 24 in the route of the prepreg sheet PS in the feed head 20. As described above, the release paper RP is bonded to the one surface of the prepreg sheet PS. The cutting mechanism 30 cuts only the prepreg sheet PS, and does not cut the release paper RP.

The lay-up mechanism includes a placement mechanism 26 that places the prepreg sheet PS on the sheet material SM at a predetermined lay-up position on the table 40, and a press mechanism 28 that presses the placed prepreg sheet PS against the sheet material SM.

The placement mechanism 26 includes a placement guide 26a that guides the prepreg sheet PS so that the prepreg sheet PS contacts the sheet material SM at the lay-up position on the table 40. The placement mechanism 26 is configured such that the placement guide 26a is supported by a ball screw mechanism and is driven so as to be displaced in the top-bottom direction. More specifically, the placement mechanism 26 includes a ball screw mechanism including a driving motor 26b, a screw shaft 26c coupled with the output shaft of the driving motor 26b, and a nut 26d screwed on the screw shaft 26c. The placement guide 26a is supported by the nut 26d of the ball screw mechanism with a bracket 26e provided therebetween. The ball screw mechanism is provided in the support frame such that the screw shaft 26c extends downward in the vertical direction.

The placement mechanism 26 also includes a guide (not illustrated) that prevents the nut 26d and the bracket 26e from rotating together with the screw shaft 26c and guides the movement of the bracket 26e and the placement guide 26a in the top-bottom direction. Thus, the placement mechanism 26 is configured such that the driving motor 26b rotationally drives the screw shaft 26c to displace the nut 26d and the bracket 26e upward or downward depending on the rotation direction of the screw shaft 26c, thereby displacing the placement guide 26a in the top-bottom direction. The driving motor 26b of the placement mechanism 26 is controlled so that the placement guide 26a is displaced in the top-bottom direction between two positions: an operation position, at which the placement guide 26a is positioned when the prepreg sheet PS is placed on the table 40 and which is close to the upper surface (lay-up surface) of the table 40, and a retracted position, at which the placement guide 26a is separated upward from the lay-up surface of the table 40.

The press mechanism 28 includes a press roller (compaction roller) 28a that presses the prepreg sheet PS placed on the sheet material SM against the sheet material SM. The press mechanism 28 is configured such that the press roller 28a is supported by a fluid-pressure cylinder 28b such as an air cylinder. That is, the press mechanism 28 includes the fluid-pressure cylinder 28b and the press roller 28a. The press roller 28a is supported rotatably relative to a rod of the fluid-pressure cylinder 28b through a bracket 28c. The fluid-pressure cylinder 28b is provided in the support frame on the downstream side of the placement mechanism 26 in the pull-out direction of the prepreg sheet PS such that the rod extends downward in the vertical direction. The placement mechanism 26 and the press mechanism 28 are arranged such that the center of the placement guide 26a and the center of the press roller 28a coincide with each other in the width direction of the feed head 20 (the width direction of the prepreg sheet PS).

The fluid-pressure cylinder 28b of the press mechanism 28 is, for example, a single-acting air cylinder, and contains an urging portion such as a spring that urges the rod in the retraction direction (upward). When the fluid-pressure cylinder 28b of the press mechanism 28 is supplied with compressed air, the rod of the fluid-pressure cylinder 28b is advanced downward, and the press roller 28a is pressed against the prepreg sheet PS placed on the sheet material SM. Then, the feed head 20 moves in the lay-up direction. The press roller 28a of the press mechanism 28 rotates and moves on the placed prepreg sheet PS in a pressed manner against the prepreg sheet PS. Consequently, the placed prepreg sheet PS is bonded to the sheet material SM by contact bonding and hence is laid up. When the feed head 20 moves at a timing other than the lay-up of the prepreg sheet PS (prepreg sheet piece PS'), the supply of the compressed air to the fluid-pressure cylinder 28b is stopped. The rod is displaced in the retraction direction, and hence the press roller 28a is separated upward from the table 40.

The feed head 20 also includes a recovery unit that winds up and recovers the release paper separated from the laid up prepreg sheet PS. That is, the feed head 20 includes the recovery unit including a wind-up reel 25 for winding up the release paper RP. The continuous elongated state of the release paper RP is maintained because the cutting mechanism 30 cuts only the prepreg sheet PS. The wind-up reel 25 of the recovery unit is supported so as to be fitted non-rotatably relative to a support shaft 25a provided between the support plates 23 of the support frame rotatably relative to the support plates 23.

The recovery unit also includes a guide roll 27 for guiding the route of the release paper RP. The guide roll 27 is arranged above the placement guide 26a, and guides the release paper RP upward from the leading end of the placement guide 26a of the placement mechanism 26. The guide roll 27 is arranged so that the route for the release paper RP extending from the placement guide 26a to the guide roll 27 does not interfere with the press mechanism 28 arranged on the downstream side. With this configuration, the wind-up reel 25 (support shaft 25a) is arranged at a position at which the wind-up reel 25 can wind up the release paper RP guided by the guide roll 27.

The recovery unit includes a driving motor 25b for rotationally driving the wind-up reel 25. The driving motor 25b is coupled with the support shaft 25a that supports the wind-up reel 25. Also, the feed unit for the prepreg sheet PS including the raw-material roll 21 includes a driving motor 21*b* for rotationally driving the raw-material roll 21. The driving motor 21*b* is coupled with the support shaft 21*a* that supports the raw-material roll 21.

With the driving motor 21*b* of the feed unit and the driving motor 25*b* of the recovery unit, the feed head 20 moves in the lay-up direction while the prepreg sheet PS is placed on the sheet material SM by the placement guide 26*a* of the placement mechanism 26 and is pressed against the sheet material SM by the press roller 28*a* of the press mechanism 28. Thus, the prepreg sheet PS is pulled out from the raw-material roll 21. When the prepreg sheet PS is pulled out from the raw-material roll 21 along with the movement of the feed head 20, the driving for rotationally driving the raw-material roll 21 by the driving motor 21*b* coupled with the support shaft 21*a* that supports the raw-material roll 21 is controlled so that the prepreg sheet PS extending from the raw-material roll 21 to the lay-up position (the lower end of the placement guide 26*a*) has a desired tension without slack or twist. Also, the driving for rotationally driving the wind-up reel 25 by the driving motor 25*b* coupled with the support shaft 25*a* that supports the wind-up reel 25 is controlled so that the release paper RP sequentially separated from the prepreg sheet PS by the movement of the feed head 20 at the lay-up is wound up around the wind-up reel 25 properly without slack or the like.

In the automatic lay-up machine including the above-described configurations, when the lay-up of the prepreg sheet PS on the sheet material SM is started, the feed head 20 is positioned at a lay-up start position at which the placement guide 26*a* of the placement mechanism 26 is positioned on the side edge of the sheet material SM. Further, when the feed head 20 is at the lay-up start position, the placement guide 26*a* of the placement mechanism 26 is lowered to the operation position. Accordingly, the prepreg sheet PS extending from the raw-material roll 21 is pressed by the placement guide 26*a* against the sheet material SM on the table 40 at the lay-up start position.

Then, the feed head 20 is moved in the lay-up direction by the support mechanism 50 as described above. Thus, the prepreg sheet PS pulled out from the raw-material roll 21 in the feed head 20 is placed on the sheet material SM on the table 40 in the lay-up direction. Regarding the pull-out direction of the prepreg sheet PS placed as described above, in the automatic lay-up machine according to the exemplary embodiment, the prepreg sheet PS is not actively pulled out from the feed device of the feed head 20. The prepreg sheet PS is relatively pulled out from the feed device of the feed head 20 when the feed head 20 moves in the lay-up direction while the prepreg sheet PS is placed on the sheet material SM as described above. Accordingly, the pull-out direction of the prepreg sheet PS is a direction parallel to the moving direction of the feed head 20 (lay-up direction) and opposite to the moving direction (direction to the rear side in the moving direction).

Also, when the feed head 20 moves, the press roller 28*a* of the press mechanism 28 provided on the downstream side with respect to the placement mechanism 26 is urged downward by the supply with the compressed air to the fluid-pressure cylinder 28*b*. Accordingly, the prepreg sheet PS placed on the sheet material SM is sequentially pressed against the sheet material SM by the press roller 28*a*, bonded to the sheet material SM by the adhesiveness of the prepreg sheet PS by contact bonding, and hence is laid up on the sheet material SM.

In such a lay-up process, the prepreg sheet PS extending from the raw-material roll 21 is cut by the cutting mechanism 30 at a timing at which the prepreg sheet PS with a preset length is pulled out from the raw-material roll 21. At the cutting, only the prepreg sheet PS is cut and the release paper RP bonded to the prepreg sheet PS is not cut as described above. The prepreg sheet PS is bonded to the release paper RP which is not cut, and hence the prepreg sheet PS moves together with the release paper RP so that the cut ends of the prepreg sheet PS located upstream of the cut position (the prepreg sheet PS extending from the raw-material roll 21) and the prepreg sheet PS located downstream of the cut position (the prepreg sheet piece PS' cut off from the prepreg sheet PS extending from the raw-material roll 21) move toward the placement guide 26*a*.

Then, the placement guide 26*a* of the placement mechanism 26 reaches the position of the side edge of the sheet material SM along with the movement of the feed head 20. The placement guide 26*a* is maintained to be positioned at the operation position until that timing. Hence, the prepreg sheet piece PS' is placed on the sheet material SM such that the placement guide 26*a* traces the upper surface of the prepreg sheet piece PS' to the cut end. In the placement mechanism 26, the driving motor 26*b* is driven and the placement guide 26*a* is displaced toward the retracted position at the timing at which the placement guide 26*a* reaches the position of the side edge of the sheet material SM as described above. Also, in the press mechanism 28, the press roller 28*a* is maintained to be urged downward by the fluid-pressure cylinder 28*b* until the press roller 28*a* passes through the position of the side edge of the sheet material SM. Accordingly, the prepreg sheet piece PS' is pressed against the sheet material SM by the press roller 28*a* to the cut end, and is bonded to the sheet material SM by contact bonding and laid up over the entire region of the prepreg sheet piece PS'. In the press mechanism 28, the supply with the compressed air to the fluid-pressure cylinder 28*b* is stopped and the press roller 28*a* is displaced upward at the timing at which the press roller 28*a* passes through the position of the side edge of the sheet material SM.

After the feed head 20 completes single lay-up operation for the prepreg sheet piece PS' as described above, the feed head 20 is moved to the lay-up start position, starts the lay-up operation again, and repetitively executes the lay-up operation. In this way, in the automatic lay-up machine, prepreg sheet pieces PS' are sequentially laid up on the sheet material SM to be arranged side by side in the front-rear direction, and thus the sheet-shaped carbon fiber base material CM is formed. Further, the carbon fiber base material CM formed as described above moves on the table 40 as described above, and is wound up around the wind-up shaft 45 in the wind-up mechanism provided in front of the table 40.

In the automatic lay-up machine that performs the lay-up operation as described above, the feed head 20 includes the feed device for feeding the prepreg sheet PS (reinforcing fiber material). Also, the feed device includes, in addition to the raw-material roll 21 from which the prepreg sheet PS is pulled out, the cutting mechanism 30 for cutting off the prepreg sheet piece PS' from the prepreg sheet PS. According to the present invention, the cutting mechanism of the feed device for the reinforcing fiber material includes a cutter roll, a receiving member, and a rotational driving mechanism. The cutter roll includes a roll body, and a blade portion that protrudes from a peripheral surface of the roll body. The blade portion extends in an axial direction of the roll body at a same position on a circumference of the roll body. The receiving member extends in the axial direction of the roll body of the cutter roll and is provided to face the cutter roll. The rotational driving mechanism rotationally drives the cutter roll. The reinforcing fiber material (prepreg sheet PS) is cut by the cutter roll and the receiving member.

To be specific, the cutting mechanism 30 of the feed head 20 according to the exemplary embodiment includes, for example, a cutter roll 31 and an anvil roll 32 serving as the receiving member as illustrated in FIG. 3. The cutter roll 31 includes a roll body 31a as a main body, and a blade portion 31b integrally formed with the roll body 31a to protrude from the peripheral surface of the roll body 31a. The blade portion 31b is formed to extend in the axial direction of the roll body 31a at the same position in the circumferential direction on the peripheral surface of the roll body 31a. That is, the blade edge of the blade portion 31b is formed on the peripheral surface of the roll body 31a such that the blade edge extends in line in the axial direction of the roll body 31a.

Also, the cutter roll 31 includes shaft portions 31c formed to protrude in the axial direction from both ends of the roll body 31a. The cutter roll 31 is supported by the shaft portions 31c at both the ends rotatably relative to a support frame 33 through bearings or the like (not illustrated). The support frame 33 is a housing having a rectangular shape in plan view and side view. Both sides of the housing in the depth direction (the direction perpendicular to the paper plane in FIG. 3A, the direction parallel to the paper plane in FIG. 3B) are open. The housing has a size that can house the cutter roll 31 therein. The cutter roll 31 is supported by side walls 33a on both sides in the longitudinal direction of the support frame 33.

The anvil roll 32 serving as the receiving member includes a roll-shaped receiving roll 32a as a main body, and shaft portions 32b formed to protrude in the axial direction from both ends of the receiving roll 32a. The shaft portions 32b on both ends of the anvil roll 32 are supported by the side walls 33a on both sides of the support frame 33 through bearings or the like (not illustrated), similarly to the cutter roll 31. When the anvil roll 32 is in the supported state, the axis of the receiving roll 32a is parallel to the axis of the roll body 31a of the cutter roll 31, or in other words, the anvil roll 32 is provided to extend in the axial direction of the roll body 31a. Also, the support position of the cutter roll 31 and the support position of the anvil roll 32 with respect to the support frame 33 (side walls 33a) are the same in the depth direction. The cutter roll 31 faces the anvil roll 32 in the height direction of the support frame 33 (in the long-side direction of the side walls 33a).

The cutting mechanism 30 also includes a rotational driving mechanism 34 for rotationally driving the cutter roll 31. The rotational driving mechanism 34 includes a driving motor 34a serving as a drive source, a driving gear 34b fixed to the output shaft of the driving motor 34a, and a driven gear 34c attached to the cutter roll 31. The driven gear 34c of the rotational driving mechanism 34 is fitted to one of the shaft portions 31c on both sides of the cutter roll 31 non-rotatably relative to that shaft portion 31c. When the cutter roll 31 is supported by the support frame 33, the driven gear 34c is positioned between the roll body 31a and the inner side surface of the side wall 33a of the support frame 33. The driving motor 34a is attached to the support frame 33 by a bracket 34d such that the output shaft of the driving motor 34a extends in the plate thickness direction of the side wall 33a of the support frame 33 and the driving gear 34b fixed to the output shaft meshes with the driven gear 34c. When the driving motor 34a is driven and the output shaft thereof is rotated, the rotation is transmitted to the cutter roll 31 through the driving gear 34b and the driven gear 34c. Thus the cutter roll 31 is rotationally driven.

In this exemplary embodiment, a driven gear 34e is attached to one of the shaft portions 32b on both sides of the anvil roll 32 when the anvil roll 32 is supported by the support frame 33. The shaft portion 32b on the same side as the shaft portion 31c to which the driven gear 34c of the cutter roll 31 is attached. The driven gear 34e meshes with the driven gear 34c attached to the cutter roll 31 when the cutter roll 31 and the anvil roll 32 are supported by the support frame 33. Thus, the anvil roll 32 is also rotationally driven when the cutter roll 31 is rotationally driven by the rotational driving mechanism 34.

In the feed head 20, the cutting mechanism 30 is provided between the guide roll 22 and the guide roll 24 in the route of the prepreg sheet PS as described above so that the prepreg sheet PS passes through the region between the cutter roll 31 and the anvil roll 32. The gap between the cutter roll 31 and the anvil roll 32 through which the prepreg sheet PS passes (the clearance between the peripheral surfaces of both) is set so that only the prepreg sheet PS cut (the release paper RP is not cut) as described above by the blade portion 31b protruding from the roll body 31a of the cutter roll 31.

Also, in the automatic lay-up machine according to this exemplary embodiment as described above, the carbon fiber base material CM is manufactured as an angle layer material in which the orientation of the carbon fibers serving as the reinforcing fibers is at an angle with respect to the longitudinal direction and the width direction of the carbon fiber base material CM manufactured as described above. Hence, the lay-up direction of the prepreg sheet PS (prepreg sheet piece PS') on the sheet material SM is a direction at an angle with respect to the width direction and the longitudinal direction of the sheet material SM as illustrated in FIG. 4A. In the example illustrated in FIGS. 4A and 4B, the angle of the lay-up direction with respect to the width direction and the longitudinal direction of the sheet material SM is 45°. The angle may be appropriately set in accordance with the fiber reinforced composite formed by using the carbon fiber base material CM. For example, the angle may be set at 60°, 45°, 30°, −30°, −45°, or −60°.

Further, in the automatic lay-up machine, the prepreg sheet PS is cut by the cutting mechanism 30 at a cutting angle (in the example in FIGS. 4A and 4B, 45°) in accordance with the angle of the lay-up direction with respect to the width direction and the longitudinal direction of the sheet material SM so that the cut end of the prepreg sheet piece PS' laid up at the aforementioned angle (lay-up direction) coincides with the side edge of the sheet material SM. Hence, in the feed head 20, the cutting mechanism 30 is provided so that the axis of the roll body 31a of the cutter roll 31 is at the cutting angle with respect to the direction parallel to the pull-out direction of the prepreg sheet PS.

With this configuration, the cutter roll 31 of the cutting mechanism 30 is rotationally driven by the rotational driving mechanism 34 as described above in the cutting operation for the prepreg sheet PS. At the same time, the cutter roll 31 to be rotationally driven is displaced (slid) in the axial direction of the roll body 31a and toward the side in the pull-out direction of the prepreg sheet PS.

The side in the pull-out direction of the prepreg sheet PS (reinforcing fiber material) is the side toward which the entire cutter roll 31 moves in the pull-out direction of the prepreg sheet PS with regard to the longitudinal direction of the prepreg sheet PS as described above. To be specific, with reference to FIG. 4B, the displacement in the axial direction of the roll body 31a of the cutter roll 31 may be displacements in two directions of upper and lower directions in the drawing. When the cutter roll 31 is displaced in the upper direction, the respective portions of the entire cutter roll 31 move in a direction opposite to the pull-out direction of the prepreg sheet PS (=lay-up direction) with regard to the longitudinal direction of the prepreg sheet PS. In contrast, when the cutter roll 31 is displaced in the lower direction, the respective portions of the entire cutter roll 31 move in the pull-out direction of the prepreg sheet PS with regard to the longitudinal direction of the prepreg sheet PS. Hence, the side in the pull-out direction of the prepreg sheet PS in the axial direction in this case is the lower direction (direction indicated by arrow s).

By sliding the cutter roll 31 toward the side in the pull-out direction when the prepreg sheet PS is cut, even when the cutter roll 31 is provided at the angle described above with respect to the pull-out direction of the prepreg sheet PS, the prepreg sheet PS is reliably cut, and the positional shift in the width direction of the prepreg sheet PS caused by the contact between the blade portion 31b and the prepreg sheet PS is prevented as much as possible.

To be more specific, as illustrated in FIGS. 4A and 4B, in the feed head 20 of the automatic lay-up machine according to this exemplary embodiment, the cutting mechanism 30 is provided so that the axis of the roll body 31a of the cutter roll 31 is at the angle of 45° with respect to the moving direction of the feed head 20. Hence, the moving direction of the blade portion 31b when the prepreg sheet PS is cut (when the blade portion 31b contacts the prepreg sheet PS) along with the rotation of the cutter roll 31 is a direction at the angle of 45° with respect to the pull-out direction of the prepreg sheet PS in a view in the thickness direction of the prepreg sheet PS as indicated by arrow r in FIG. 4B. Hence, if the prepreg sheet PS is cut only by the rotation of the cutter roll 31, a cutting failure may occur such that the prepreg sheet PS is not completely cut due to the difference between the pull-out direction (relative moving direction) of the prepreg sheet PS and the moving direction of the blade portion 31b. Also, as described above, the blade portion 31b causes a force to act on the prepreg sheet PS in a direction different from the pull-out direction at the cutting due to the different moving directions as described above. Hence, the positional shift in the width direction of the prepreg sheet PS may be generated.

In contrast, by sliding the cutter roll 31 toward the side in the pull-out direction (direction indicated by arrow s) at the cutting as described above, regarding each of the respective points on the blade portion 31b that contacts the prepreg sheet PS at the cutting, each point is displaced in the direction indicated by arrow s along with the slide of the cutter roll 31 while being displaced in the direction indicated by arrow r along with the rotation of the cutter roll 31. Hence, the displacement direction of each point is a direction close to the pull-out direction of the prepreg sheet PS as indicated by arrow rs by combining both the displacements. In the case of this exemplary embodiment, since the angle of the roll body 31a with respect to the lay-up direction is 45°, the direction of the combined displacements coincides with the pull-out direction of the prepreg sheet PS. Accordingly, the cutting failure and the positional shift in the width direction of the prepreg sheet PS as described above are prevented.

Figure 3B:
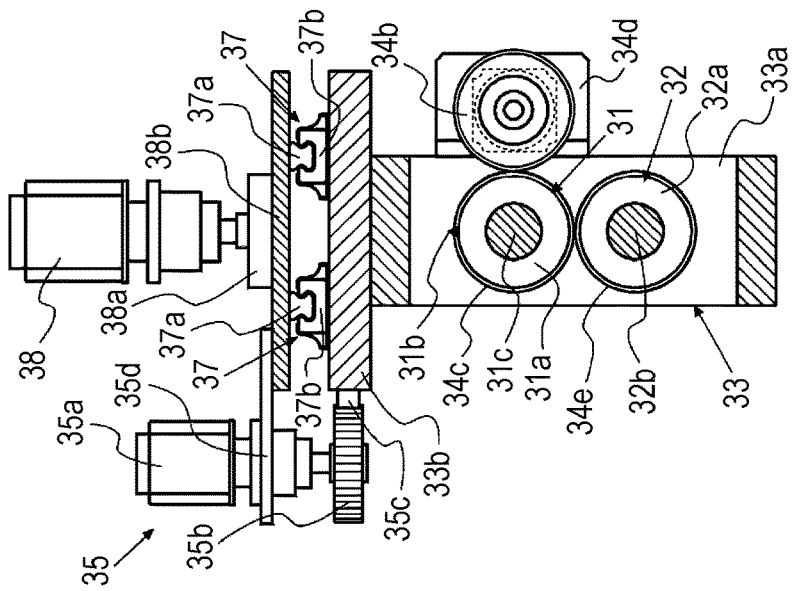
FIG. 3B is a partly sectioned side view of the embodiment.
Figure 3A:
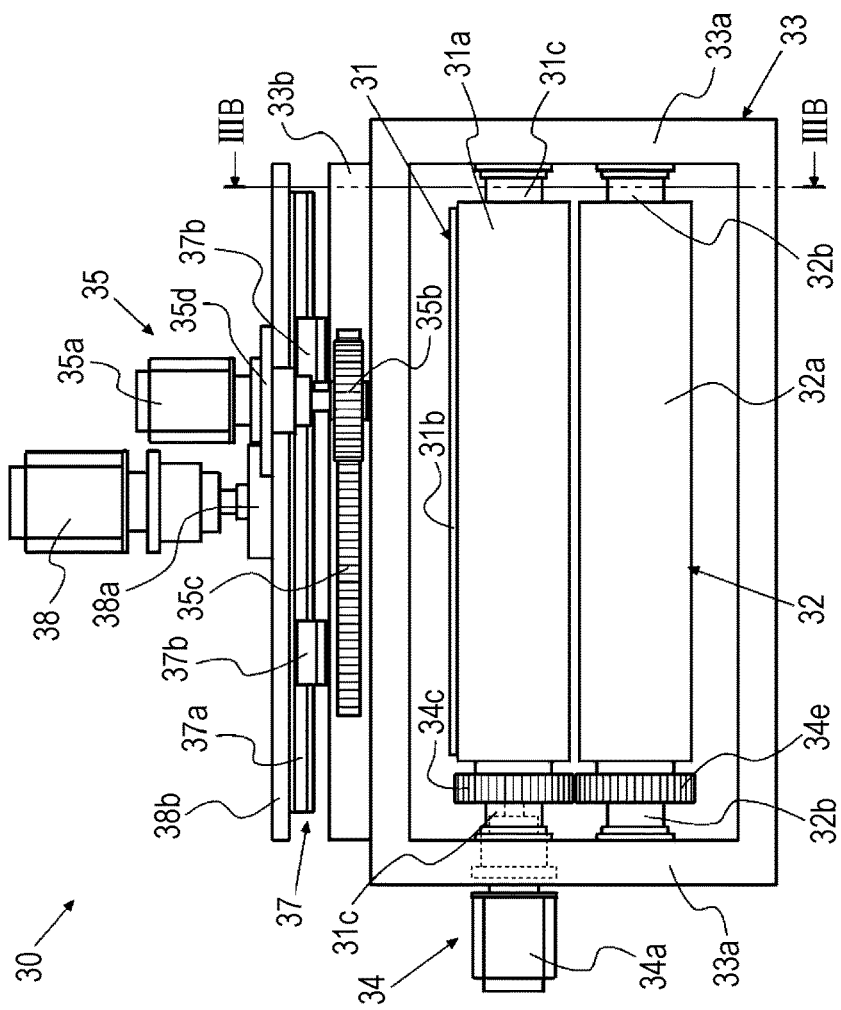
FIG. 3A is a front view illustrating an embodiment of a cutting mechanism of the feed device according to the present invention.
Figure 5:
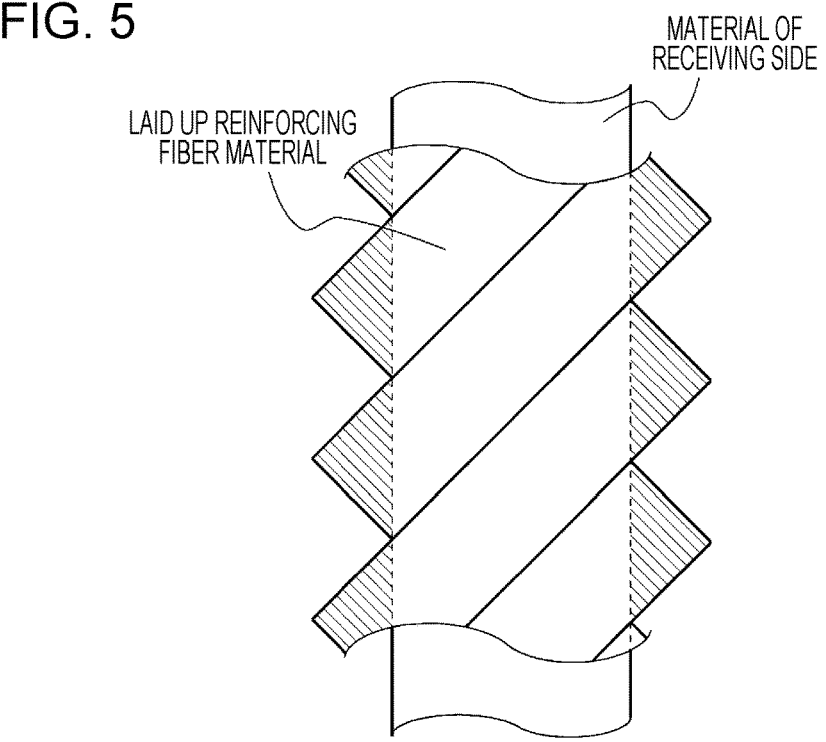
FIG. 5 is an explanatory view for explaining related art.
Figure 6:
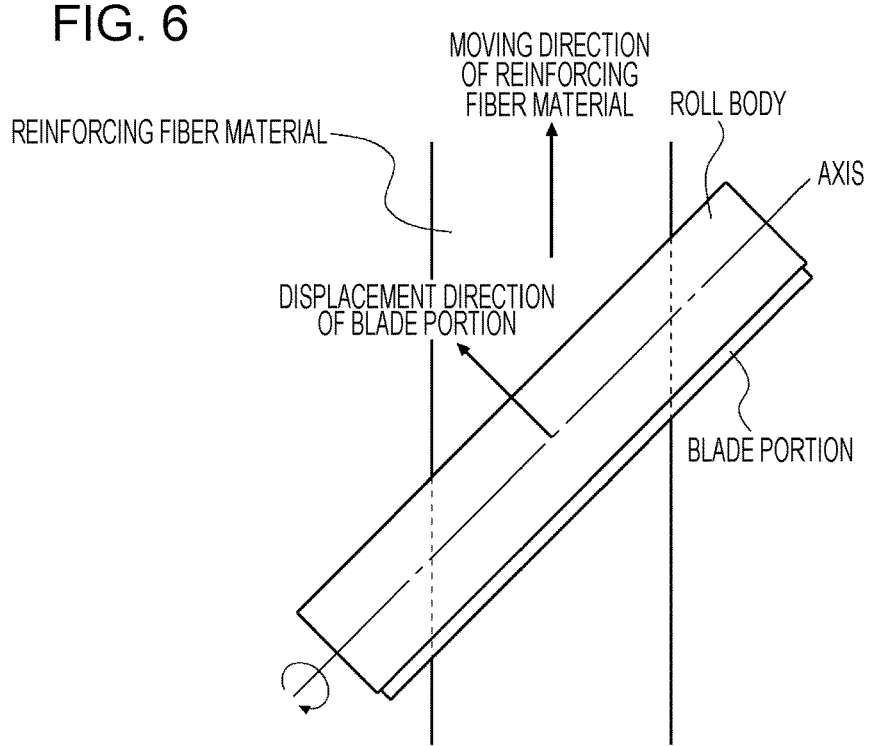
FIG. 6 is an explanatory view for explaining related art.

Regarding the configuration of the cutting mechanism 30 for sliding the cutter roll 31 in the axial direction, in this exemplary embodiment, the configuration illustrated in FIGS. 3A and 3B is employed as an example. The details of the configuration of the cutting mechanism 30 for sliding the cutter roll 31 as illustrated in FIGS. 3A and 3B are as follows.

In this exemplary embodiment, in the cutting mechanism 30, the support frame 33 that supports the cutter roll 31 and the anvil roll 32 as described above are supported with respect to the feed head 20 through a driving motor 38 for angle adjustment. The driving motor 38 for angle adjustment is for adjusting the cutting angle (the angle of the axis of the roll body 31a of the cutter roll 31 with respect to the width direction (longitudinal direction) of the prepreg sheet PS). The driving motor 38 is supported with respect to both the support plates 23 of the support frame of the feed head 20 by a bracket or the like (not illustrated) such that the output shaft thereof faces downward in the vertical direction.

A base plate 38b having a plate shape and being rectangular in a view in the plate-thickness direction is attached to the output shaft of the driving motor 38 through a bracket 38a such that the plate-thickness direction coincides with the axial direction of the output shaft. That is, the driving motor 38 supported by the support frame supports the base plate 38b through the bracket 38a. The base plate 38b is supported by the driving motor 38 at the center of the plate surface in a view in the plate-thickness direction.

In contrast, a support plate 33b having a plate shape and being rectangular in a view in the plate-thickness direction is attached to the support frame 33. The support plate 33b is fixed to the support frame 33 such that one of both plate surfaces in the plate-thickness direction of the support plate 33b contacts the upper surface of the support frame 33 and the center of the support plate 33b coincides with the center of the support frame 33 in front view and side view. The support plate 33b has a size such that the dimension in the long-side direction of the plate surface thereof corresponds to the dimension in the long-side direction of the plate surface of the base plate 38b.

The support plate 33b is arranged such that the upper surface thereof (a surface opposite to a surface near the support frame 33) faces the lower surface of the base plate 38b (a surface opposite to a surface near the driving motor 38) supported by the driving motor 38 as described above. The support plate 33b is supported at the base plate 38b by a pair of LM guides 37 arranged between the support plate 33b and the base plate 38b.

To be specific, LM rails 37a of the LM guides 37 are attached to the lower surface of the base plate 38b (the surface opposite to the surface near the driving motor 38), and LM blocks 37b of the LM guides 37 are attached to the upper surface of the support plate 33b (the surface opposite to the surface near the support frame 33). Both the LM rails 37a of the pair of LM guides 37 are fixed to the base plate 38b such that the extending direction thereof coincides with the long-side direction of the base plate 38b, and a gap is provided in the short-side direction of the plate surface of base plate 38b, in an arrangement symmetric about the center of the short-side direction. Also, the LM blocks 37b are fixed to the support plate 33b such that a pair of two LM blocks 37b is provided for each LM rail 37a, and two pairs of LM rails 37a are arranged to be symmetrical about the center in the short-side direction with the same gap as the gap of the pair of LM rails 37a in the short-side direction of the plate surface of the support plate 33b. The two LM blocks 37b in each pair are arranged with a gap in the long-side direction.

With this configuration, the support plate 33b is supported by the LM guide 37 in a manner displaceable in the long-side direction with the arrangement in which the center in the short-side direction of the support plate 33*b* coincides with the center in the short-side direction of the base plate 38*b*. Consequently, the support frame 33 and the cutter roll 31 supported by the support frame 33 are supported with respect to the base plate 38*b* supported by the driving motor 38 through the pair of LM guides 37 and the support plate 33*b*, in a manner displaceable in the long-side direction of the base plate 38*b*. In this support state, the axial direction of the roll body 31*a* of the cutter roll 31 coincides with the long-side direction of the base plate 38*b*. Hence, the cutter roll 31 is displaceable in the axial direction in this support state.

Moreover, the cutting mechanism 30 includes a slide mechanism 35 for displacing the cutter roll 31 in the axial direction. The slide mechanism 35 includes a driving motor 35*a* and a rack and pinion mechanism serving as a driving-force transmission mechanism that transmits rotation of the output shaft of the driving motor 35*a*. The LM guides 37 for supporting the support frame 33 (cutter roll 31) in a manner displaceable in the axial direction are also included in the slide mechanism 35.

To be more specific, in the slide mechanism 35, a rack 35*c* of the rack and pinion mechanism is attached to one of side surfaces extending in the long-side direction of the support plate 33*b* fixed to the support frame 33. Also, the driving motor 35*a* is supported by a bracket 35*d* attached to the base plate 38*b* such that the output shaft of the driving motor 35*a* faces downward in the vertical direction. That is, the driving motor 35*a* is arranged in a fixed manner to the base plate 38*b*. A pinion 35*b* of the rack and pinion mechanism is attached to the output shaft of the driving motor 35*a*.

The arrangement of the driving motor 35*a* in the top-bottom direction and the arrangement of the base plate 38*b* in the short-side direction are determined at positions at which the pinion 35*b* attached to the output shaft of the driving motor 35*a* meshes with the rack 35*c*. Also, the arrangement of the driving motor 35*a* in the long-side direction of the base plate 38*b* is determined at a position at which the pinion 35*b* meshes with one end of the rack 35*c*, the one end which is an end portion of the rack 35*c* on the side in the slide direction of the cutter roll 31 with respect to the center of the rack 35*c*, in initial arrangement in which the center of the base plate 38*b* coincides with the center of the support frame 33 in the long-side direction.

With the configuration of the slide mechanism 35, the driving motor 35*a* is driven and the pinion 35*b* is rotationally driven, and hence the support plate 33*b* to which the rack 35*c* that meshes with the pinion 35*b* is attached and the support frame 33 to which the support plate 33*b* is attached are driven to be displaced in the long-side direction of the base plate 38*b* with respect to the driving motor 35*a* arranged in a fixed manner to the base plate 38*b*. Consequently, the cutter roll 31 is driven to be displaced in the axial direction of the roll body 31*a* relative to the base plate 38*b* supported by the support frame of the feed head 20 via the driving motor 38.

In the cutting mechanism 30 according to this exemplary embodiment, the anvil roll 32 serving as the receiving member is also supported by the support frame 33 together with the cutter roll 31. Hence, when the driving motor 35*a* is driven and the support frame 33 is driven to be displaced as described above, the anvil roll 32 is also driven to be displaced in the axial direction together with the cutter roll 31.

The cutting mechanism 30 according to this exemplary embodiment performs the cutting operation for the prepreg sheet PS by rotationally driving the cutter roll 31 intermittently. To be more specific, the blade portion 31*b* of the cutter roll 31 is positioned at a position (standby position) illustrated in FIG. 3B at a timing other than the cutting operation. The standby position of the blade portion 31*b* in the illustrated example is one of two positions at which a line passing through the axis of the roll body 31*a* and the axis of the receiving roll 32*a* of the anvil roll 32 in a view in the axial direction of the roll body 31*a* crosses the peripheral surface of the roll body 31*a*, the one position being opposite to the other position near the anvil roll 32. The rotational driving of the cutter roll 31 by the rotational driving mechanism 34 is started at a timing at which the blade portion 31*b* contacts the prepreg sheet PS when the prepreg sheet PS with the preset length is pulled out from the raw-material roll 21, and is stopped when the cutter roll 31 is rotated by one turn and the blade portion 31*b* is repositioned at the standby position. That is, in the rotational driving mechanism 34, the driving motor 34*a* is driven to perform such rotational driving of the cutter roll 31. The driving of the driving motor 34*a* is controlled by a driving control device (not illustrated).

In this exemplary embodiment, displacement driving in the axial direction of the cutter roll 31 by the slide mechanism 35 is performed together with the above-described rotational driving of the cutter roll 31. That is, the displacement driving by the slide mechanism 35 is started when the rotational driving of the cutter roll 31 is started, and is performed so that the cutter roll 31 is displaced in the axial direction at a preset speed. The displacement driving of the slide mechanism 35 is stopped at the timing at which the rotational driving of the cutter roll 31 is stopped.

However, regarding the displacement driving by the slide mechanism 35, unlike the rotational driving by one turn by the rotational driving mechanism 34 in which the blade portion 31*b* returns to the standby position again, the positions of the support frame 33, the cutter roll 31 supported by the support frame 33, and other members in the long-side direction of the base plate 38*b* are displaced to positions from the positions in the initial arrangement after the displacement driving. Owing to this, the slide mechanism 35 performs an operation of returning the position of the cutter roll 31 in the long-side direction of the base plate 38*b* to position in the initial arrangement before the next cutting operation for the prepreg sheet PS (the rotational driving of the cutter roll 31) is started. The above-described displacement driving of the cutter roll 31 and the driving of the driving motor 35*a* of the slide mechanism 35 to return the cutter roll 31 to the position in the initial arrangement are controlled by the driving control device.

The rotational driving of the cutter roll 31 by the rotational driving mechanism 34 and the displacement driving of the cutter roll 31 by the slide mechanism 35 are started by the rotation driving of the cutter roll 31 at the timing at which the blade portion 31*b* contacts the prepreg sheet PS when the prepreg sheet PS with the preset length is pulled out from the raw-material roll 21. The start timing is set in the driving control device as a set value relating to the length of the prepreg sheet PS. Moreover, for example, the feed head 20 (feed device) is provided with a detector (not illustrated) for detecting the pull-out length when the prepreg sheet PS is pulled out from the raw-material roll 21. The driving control device controls the start of driving the driving motor 34*a* of the rotational driving mechanism 34 and the driving motor 35*a* of the slide mechanism 35.

Also, the rotation speed of the cutter roll 31 in the rotational driving by the rotational driving mechanism 34 is set in the driving control device, as a speed corresponding to the pull-out speed of the prepreg sheet PS from the raw-material roll 21 (the moving speed of the feed head 20 at the lay-up). The driving control device controls the driving motor 34a of the rotational driving mechanism 34 to cause the cutter roll 31 rotates by one turn at the set rotation speed.

Also, regarding the displacement speed of the cutter roll 31 at the displacement driving by the slide mechanism 35, a proper speed is derived, for example, by test or analysis with regard to the pull-out speed, the cutting angle, etc., of the prepreg sheet PS. Then, the derived displacement speed is set in the driving control device. The driving control device controls the driving of the driving motor 35a of the slide mechanism 35 to cause the cutter roll 31 to be displaced at the set displacement speed. The driving control device inversely drives the driving motor 35a by the same rotation amount as the rotation amount at the displacement driving after the cutting operation is completed.

While an embodiment (hereinafter, referred to as "the exemplary embodiment") has been described for the feed device for the reinforcing fiber material and the method for cutting the reinforcing fiber material based on the present invention, the present invention is not limited to the exemplary embodiment and another embodiment (modification) described below may be implemented.

(1) In the exemplary embodiment, the reinforcing fiber material to be fed by the feed device according to the present invention is the sheet material (prepreg sheet) made of the prepreg obtained by impregnating the carbon fibers serving as the reinforcing fibers with the thermosetting resin serving as the matrix resin. However, according to the present invention, the reinforcing fiber material is not limited to such a sheet material of the thermosetting prepreg using the carbon fibers. To be specific, the reinforcing fibers in the reinforcing fiber material are not limited to the carbon fibers according to the exemplary embodiment, and may be, for example, glass fibers, aramid fibers, or polyethylene fibers. The form of reinforcing fibers in the reinforcing fiber material may be any of a form in which the reinforcing fibers are arranged to extend in one direction, and a form of woven fabric formed of the reinforcing fibers as warp and weft yarns.

Alternatively, the reinforcing fiber material may be a sheet material made of so-called semi-preg obtained by coating the reinforcing fibers with the matrix resin by a certain amount of matrix resin to keep the reinforcing fibers bound. Further alternatively, the reinforcing fiber material may be a sheet material of a thermoplastic prepreg (or semi-preg) using thermoplastic resin as the matrix resin. In the case where the reinforcing fiber material uses the thermoplastic matrix resin, for example, heat welding is used for the lay-up. That is, in the lay-up, the lay-up state is maintained by applying heat or the like to the thermoplastic prepreg sheet placed on a receiving material (sheet material or the like), and welding the thermoplastic prepreg sheet to the receiving material.

(2) The machine to which the feed device according to the present invention is applied is, in this exemplary embodiment, the automatic lay-up machine that manufactures the sheet-shaped carbon fiber base material by laying up the reinforcing fiber material piece on the support member (sheet material SM) fed from the let-off mechanism. However, even in the case where the feed device according to the present invention is applied to the automatic lay-up machine, the automatic lay-up machine is not limited to the configuration including the pull-out mechanism and the wind-up mechanism for the support member as described above, and the machine may lay up the reinforcing fiber material in a multi-ply form on the table.

In this case, the machine has a configuration in which the pull-out mechanism and the wind-up mechanism are omitted from the automatic lay-up machine according to the exemplary embodiment. In the automatic lay-up machine, the reinforcing fiber material piece is placed on the sheet material placed on the table to prevent bonding to the table while the position in the front-rear direction is changed, and the reinforcing fiber material piece is laid up on the placed reinforcing fiber material piece forming the lower layer while the position in the front-rear direction is changed. In the case of the automatic lay-up machine, the lay-up direction (the angle of the reinforcing fiber material piece with respect to the front-rear direction and the width direction) may be changed on the lay-up layer basis. In this case, the arrangement angle of the cutting mechanism (the angle of the axis of the cutter roll with respect to the pull-out direction of the reinforcing fiber material) is changed so that the cutting angle corresponds to the lay-up direction at the lay-up for each layer.

The feed device according to the present invention is not limited to the configuration that is applied to the automatic lay-up machine in which the feed head moving on the table lays up the reinforcing fiber material piece like the exemplary embodiment and that is mounted on the feed head for performing the lay-up. For example, the feed device according to the present invention may be applied to an automatic lay-up machine, for example, as disclosed in Japanese Unexamined Patent Application Publication No. 2011-219269, in which a sheet-shaped reinforcing fiber material is pulled out from a raw-material roll arranged in a fixed manner, a reinforcing fiber material piece cut off from the pulled out reinforcing fiber material is laid up on a sheet-shaped receiving material at an angle with respect to the longitudinal direction and the width direction of the receiving material. In the case of the automatic lay-up machine of such a type, a portion including the raw-material roll arranged in a fixed manner (and a mechanism that supports and rotationally drives the raw-material roll in this arrangement) and a cutting mechanism provided in a route for the reinforcing fiber material pulled out from the raw-material roll corresponds to the feed device of the present invention.

Further, the machine to which the feed device according to the present invention is applied is not limited to the automatic lay-up machine that lays up the reinforcing fiber material piece on the receiving material as described above, and may be, as suggested in Japanese Patent Application No. 2016-097023 filed by the applicant of the present invention before the present application, a machine that manufactures a reinforcing fiber base material by placing thermoplastic reinforcing fiber material pieces on a table so as to arrange the thermoplastic reinforcing fiber material pieces in the longitudinal direction (front-rear direction) of the table and joining side edges of the reinforcing fiber material pieces neighboring in the longitudinal direction together by heat welding or the like.

(3) In the case where the reinforcing fiber material (prepreg) is thermoplastic as described above, since release paper is not bonded like the thermosetting prepreg of the exemplary embodiment, cutting by the cutting mechanism of the feed device is executed by completely cutting the reinforcing fiber material pulled out from the raw-material roll. That is, the cutting mechanism of the feed device according to the present invention is not limited to the configuration that cuts only a portion (only the reinforcing fiber material) of the material (the reinforcing fiber material the release paper) pulled out from the raw-material roll as described in the exemplary embodiment, and may completely cut the material pulled out from the raw-material roll.

(4) In the cutting mechanism 30 of the feed device according to the exemplary embodiment, the cutter roll 31 includes the blade portion 31b at only one position on the peripheral surface, and the cutter roll 31 is rotationally driven intermittently to make one turn every cutting operation for the reinforcing fiber material. However, if the present invention is applied to, for example, a machine in which the reinforcing fiber material is pulled out from the raw-material roll arranged in a fixed manner and the length of the reinforcing fiber material placed on the machine is only one type of length, the cutter roll of the cutting mechanism may cut the reinforcing fiber material while the cutter roll is continuously rotationally driven. That is, the cutting mechanism of the feed device according to the present invention is not limited to the mechanism in which the cutter roll is rotationally driven intermittently, and may be a mechanism in which the cutter roll is continuously rotationally driven. When the cutter roll is continuously rotationally driven, the pull-out speed of the reinforcing fiber material from the raw-material roll is set at a speed corresponding to the rotational speed of the cutter roll.

Also, the cutter roll is not limited to the one having the blade portion formed at only one position on the peripheral surface like the exemplary embodiment. A plurality of blade portions may be formed on the peripheral surface of the cutter roll, that is, the cutter roll may have a plurality of blade portions on the peripheral surface. When the cutter roll is intermittently driven, to make control on the rotation (start timing, rotation amount, etc.) uniform, the intervals of the plurality of blade portions in the peripheral direction are preferably equivalent to each other (for example, 180°-interval in case of two blade portions, or 120°-interval in case of three blade portions). However, if the rotational driving can be properly controlled, the intervals do not have to be equivalent intervals.

(5) In the cutting mechanism 30 of the feed device according to the exemplary embodiment, the rack and pinion mechanism using the driving motor 35a as a drive source is employed for the slide mechanism 35 that displaces the cutter roll 31 in the axial direction thereof. However, in the feed device according to present invention, the slide mechanism included in the cutting mechanism is not limited to the configuration like the exemplary embodiment, and may have any configuration such as a ball screw mechanism, as long as the mechanism can displace the support body that supports cutter roll in the axial direction of the cutter roll.

Also, the slide mechanism 35 according to the exemplary embodiment displaces the support body (support frame 33) that supports the cutter roll 31 and the anvil roll 32 serving as the receiving member in the axial direction of the cutter roll 31. Consequently, the cutter roll 31 is displaced in the axial direction together with the receiving member. However, according to the present invention, the slide mechanism may displace only the cutter roll from among the cutter roll and the receiving member in the axial direction. In other words, the cutting mechanism of the feed device according to the present invention has a configuration in which the support body that supports the cutter roll and the support body that supports the receiving member may be independent from each other. The slide mechanism may displace the support body that supports the cutter roll in the axial direction.

Regarding the slide mechanism according to the present invention, in the exemplary embodiment, the slide mechanism 35 controls the driving of the cutter roll 31 to displace the cutter roll 31 in the axial direction in the period in which the cutter roll 31 is rotated by one turn to cut the reinforcing fiber material (prepreg sheet PS). However, in the present invention, the displacement of the cutter roll does not have to be necessarily performed over the entire period. The displacement of the cutter roll may be performed at least when the reinforcing fiber material is actually cut, that is, in a period from when the blade portion of the cutter roll starts contacting the reinforcing fiber material to when the blade portion is separated. Hence, the control for driving the slide mechanism according to the present invention may be performed so that the cutter roll starts the displacement in a period after a timing (not including the timing) at which the cutter roll starts the rotation for single cutting operation and before a timing (including the timing) at which the blade portion contacts the reinforcing fiber material first along with the rotation. Alternatively, the control on the driving of the slide mechanism may be performed to stop the displacement of the cutter roll in a period before a timing (not including the timing) at which the rotation of the cutter roll for single cutting operation is stopped and after a timing (including the timing) at which the blade portion is separated from the reinforcing fiber material along with the rotation.

(6) Regarding other configurations of the feed device according to the present invention, in the cutting mechanism 30 according to the feed device of the exemplary embodiment, the cutter roll 31 is supported at the support frame of the feed head 20 by the driving motor 38 for angle adjustment with the support frame 33 arranged therebetween. That is, in the above-described exemplary embodiment, the cutting mechanism can adjust the cutting angle of the reinforcing fiber material by the cutter roll. However, if the automatic lay-up machine to which the feed device according to the present invention is applied, or if a machine that manufactures a reinforcing fiber base material by using a thermoplastic reinforcing fiber material is used for laying up the reinforcing fiber material at a specific angle with respect to the longitudinal direction (the front-rear direction) and the width direction (the width direction) of a table on which the reinforcing fiber material is placed, the mechanism that adjusts the cutting angle in the cutting mechanism may be omitted from the feed device.

In the cutting mechanism 30 of the feed device according to the exemplary embodiment, the anvil roll 32 is employed as the receiving member, and the rotational driving mechanism 34 that rotationally drives the cutter roll 31 also rotationally drives the anvil roll 32 along with rotational driving of the cutter roll 31. However, in the cutting mechanism of the feed device according to the present invention, even when the anvil roll is employed as the receiving member, the rotational driving mechanism in the cutting mechanism is not limited to the one that rotationally drives the anvil roll, and a rotational driving mechanism may rotationally drive only the cutter roll. The cutting mechanism may be configured such that the anvil roll serving as the receiving member is non-rotatably supported.

Also, as described above, the cutting mechanism of the feed device according to the present invention is not limited to the configuration in which the cutter roll and the receiving member are supported by the same support body. That is, in the cutting mechanism, the support body that supports the cutter roll and the support body that supports the receiving member may be independent from each other. The receiving member may be provided so as to be supported by the support plates 23 at the support frame of the feed head 20 according to the exemplary embodiment. Further, the receiving member of the cutting mechanism is not limited to the roll-shaped member such as the anvil roll employed in the exemplary embodiment, and may be a plate-shaped member or a member having a polygonal cross section.

The present invention is not limited to any of the above-described embodiments, and various modifications are possible within the scope of the present invention.

What is claimed is:

1. A feed device for an elongated sheet-shaped reinforcing fiber material made of a reinforcing fiber and a matrix resin, the feed device including a raw-material roll formed by winding the reinforcing fiber material, and a cutting mechanism for cutting the reinforcing fiber material pulled out from the raw-material roll and hence cutting off a reinforcing fiber material piece from the reinforcing fiber material, wherein the cutting mechanism comprises a cutter roll, a receiving member, and a rotational driving mechanism for rotationally driving the cutter roll, the cutter roll having a roll body and a blade portion protruding from a peripheral surface of the roll body, the blade portion formed linearly on a circumference of the roll body and extending in parallel to an axial direction of the roll body, the cutter roll arranged so that the axial direction is at a predetermined angle with respect to a width direction and a longitudinal direction of the reinforcing fiber material pulled out from the raw-material roll, the receiving member extending in the axial direction and provided to face the cutter roll, and wherein the cutting mechanism further comprises a slide mechanism that displaces the cutter roll with respect to the reinforcing fiber material in the axial direction toward a side in a pull-out direction of the reinforcing fiber material at least when the reinforcing fiber material is cut.

* * * * *